United States Patent

(12) United States Patent
Mills (10) Patent No.: US 9,187,091 B2
(45) Date of Patent: Nov. 17, 2015

(54) COLLISION DETECTION SYSTEM WITH A PLAUSIBIITY MODULE

(75) Inventor: Aaron L. Mills, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 311 days.

(21) Appl. No.: 13/598,166

(22) Filed: Aug. 29, 2012

(65) Prior Publication Data

US 2014/0032093 A1    Jan. 30, 2014

Related U.S. Application Data

(60) Provisional application No. 61/677,274, filed on Jul. 30, 2012.

(51) Int. Cl.
| | |
|---|---|
| B60R 21/00 | (2006.01) |
| B60W 30/08 | (2012.01) |
| B60W 40/107 | (2012.01) |
| B60W 30/09 | (2012.01) |
| B60W 30/095 | (2012.01) |
| B60W 40/10 | (2012.01) |

(52) U.S. Cl.
CPC ............... B60W 30/08 (2013.01); B60R 21/00 (2013.01); B60W 30/09 (2013.01); B60W 30/095 (2013.01); B60W 40/10 (2013.01); B60W 40/107 (2013.01)

(58) Field of Classification Search
CPC .......... G08G 1/16; G08G 1/165; G08G 1/166
See application file for complete search history.

(56) References Cited

U.S. PATENT DOCUMENTS

| | | | |
|---|---|---|---|
| 6,607,255 B2 | 8/2003 | Bond, III et al. | |
| 6,944,543 B2 | 9/2005 | Prakah-Asante et al. | |
| 7,016,782 B2* | 3/2006 | Schiffmann | 701/301 |
| 7,512,516 B1* | 3/2009 | Widmann | 702/151 |
| 7,777,618 B2 | 8/2010 | Schiffmann et al. | |
| 7,786,898 B2 | 8/2010 | Stein et al. | |
| 8,082,101 B2 | 12/2011 | Stein et al. | |
| 2008/0046145 A1* | 2/2008 | Weaver et al. | 701/41 |
| 2008/0183360 A1 | 7/2008 | Zhang et al. | |
| 2008/0269997 A1* | 10/2008 | Ezoe et al. | 701/70 |
| 2009/0143986 A1 | 6/2009 | Stein et al. | |

(Continued)

FOREIGN PATENT DOCUMENTS

| | | |
|---|---|---|
| EP | 1898232 | 3/2008 |
| WO | 2008004077 | 1/2008 |

*Primary Examiner* — Redhwan K Mawari
*Assistant Examiner* — Edward Torchinsky
(74) *Attorney, Agent, or Firm* — Frank MacKenzie; Price Heneveld LLP (57) ABSTRACT

A collision detection system for a vehicle includes a sensor and a camera. The sensor measures a first data set of an object relative to the vehicle. The camera measures a second data set of the object relative to the vehicle and separately measures an image-based time-to-collision with the object based on scalable differences of captured images. A fusion module matches data from the sensor and the camera and estimates a collision threat based on the matched data. A plausibility module generates a signal if the measured image-based time-to-collision is less than a calculated steering-based time-to-collision and a braking-based time-to-collision with the object. A countermeasure module actuates a countermeasure device, such as an autonomous braking system, if the collision threat exceeds an actuation threshold and the signal from the plausibility module is received, thereby statistically reducing the rate of false actuations of the countermeasure device.

19 Claims, 5 Drawing Sheets

(56) References Cited

U.S. PATENT DOCUMENTS

| | | | |
|---|---|---|---|
| 2010/0191391 A1* | 7/2010 | Zeng | 701/1 |
| 2011/0133914 A1 | 6/2011 | Griffin et al. | |
| 2011/0163904 A1 | 7/2011 | Alland et al. | |
| 2011/0178658 A1 | 7/2011 | Kotaba et al. | |
| 2011/0178710 A1* | 7/2011 | Pilutti et al. | 701/301 |
| 2012/0140061 A1* | 6/2012 | Zeng | 348/135 |

\* cited by examiner

COLLISION DETECTION SYSTEM WITH A PLAUSIBIITY MODULE

CROSS-REFERENCE TO RELATED APPLICATION

This application claims priority under 35 U.S.C. §119(e) to, and the benefit of, U.S. Provisional Patent Application No. 61/677,274, entitled "COLLISION DETECTION SYSTEM WITH A PLAUSIBILITY MODULE," filed on Jul. 30, 2012, the entire disclosure of which is hereby incorporated by reference.

FIELD OF THE INVENTION

The present invention generally relates to a collision detection system for a vehicle that actuates a countermeasure device to mitigate or avoid a collision with an object. More specifically, the invention relates to a collision detection system having at least a camera to measure data of an object relative to a host vehicle and based on the measured data and estimations of collision actuating an autonomous braking system of the vehicle.

BACKGROUND OF THE INVENTION

Automotive vehicles are increasingly being equipped with collision detection systems to identify objects in a host vehicle's path of travel, including pedestrians and other vehicles. To mitigate or avoid collisions, these systems are used in conjunction with countermeasure devices, such as autonomous braking, adaptive cruise control, emergency steering assistance, and warning systems. For instance, collision mitigation by braking (CMbB) is capable of performing autonomous braking up to full anti-lock brake system levels, which must be validated to ensure an exceptionally low rate of false brake actuation. Increased collision detection reliability without a prolonged and expensive validation process is desirable.

SUMMARY OF THE INVENTION

According to one aspect of the present invention, a collision detection system for a host vehicle includes a sensor for detecting an object in a field of view and measuring a first set of target data of the object relative to the host vehicle. The system also includes a camera for capturing a plurality of images from the field of view and processing the plurality of images to measure a second set of target data of the object relative to the host vehicle and to measure an image-based time-to-collision ($TTC_{IMAGE}$) of the host vehicle with the object based on scalable differences of the plurality of images. A fusion module determines a matched set of target data of the object relative to the host vehicle based on the first and second sets of target data received from the sensor and the camera, respectively. The fusion module estimates a threat of collision of the host vehicle with the object based on the matched set of target data. A plausibility module calculates a steering-based time-to-collision ($TTC_{STEERING}$) and a braking-based time-to-collision ($TTC_{BRAKING}$) of the host vehicle with the object based on the second set of target data received from the camera and an additional set of data received from a vehicle dynamics detector. The plausibility module generates an actuation signal if the measured $TTC_{IMAGE}$ is less than the calculated $TTC_{STEERING}$ and the $TTC_{BRAKING}$. A countermeasure module actuates a countermeasure device if the threat of collision received from the fusion module exceeds an actuation threshold and the actuation signal from the plausibility module is generated and received, thereby statistically reducing the rate of falsely actuating the countermeasure device.

According to another aspect of the present invention, a collision detection system for a vehicle includes a sensor and a camera. The sensor measures data of an object relative to the vehicle. The camera also measures data of the object relative to the vehicle and measures an image-based time-to-collision ($TTC_{IMAGE}$) with the object based on scalable differences of captured images. A fusion module matches data from the sensor and the camera and estimates a collision threat based on the matched data. A plausibility module generates a signal if the measured $TTC_{IMAGE}$ is less than a calculated steering-based time-to-collision ($TTC_{STEERING}$) and a braking-based time-to-collision ($TTC_{BRAKING}$) with the object. A countermeasure module actuates a countermeasure device if the collision threat exceeds an actuation threshold and the signal from the plausibility module is generated.

According to yet another aspect of the present invention, a vehicle collision detection system comprises a sensor and a camera. A fusion module estimates a collision threat with an object using data of the object relative to the vehicle from the sensor and the camera. A plausibility module generates a signal if an image-based time-to-collision is less than a steering-based time-to-collision and a braking-based time-to-collision. A countermeasure actuates if the collision threat exceeds a threshold and the signal is received.

According to another aspect of the present invention, a method is provided for actuating an autonomous braking controller for a brake system of a host vehicle. The method comprises the step of sensing an object in a field of view by an object detection sensor on the host vehicle. A first data set of the object is measured with the object detection sensor, including a first range and range rate of the object relative to the host vehicle, a first angle and angle rate of the object relative to the host vehicle, and a relative movement determination of the object. The method also includes the step of capturing a plurality of images based on light waves from the field of view by a camera on the host vehicle at known time intervals between instances when the images of the plurality of images are captured. The captured images are processed to measure a second data set of the object, including second range and range rate of the object relative to the host vehicle, a second angle and angle rate of the object relative to the host vehicle, a width of the object, and an image based time-to-collision ($TTC_{IMAGE}$) of the host vehicle with the object based on scalable differences of the object derived from the plurality images. An additional data set is measured with a vehicle dynamics detector, including a yaw-rate sensor for measuring a yaw rate of the host vehicle and a speed sensor for measuring the longitudinal velocity of the host vehicle. A controller is provided that receives the first and second data sets, the $TTC_{IMAGE}$, and the additional data set. The method further includes the step of estimating a threat of collision of the host vehicle with the object based on a combination of the first and second data sets. A steering-based time-to-collision ($TTC_{STEERING}$) of the host vehicle with the object is calculated as a function of the second data set, the longitudinal velocity of the host vehicle, and the yaw rate of the host vehicle. A braking-based time-to-collision ($TTC_{BRAKING}$) of the host vehicle with the object is calculated as a function of the longitudinal velocity of the host vehicle and a maximum rate of deceleration of the host vehicle. The method also includes the step of generating an actuation signal if the measured $TTC_{IMAGE}$ is less than the calculated $TTC_{STEERING}$ and the $TTC_{BRAKING}$. The autonomous braking controller for the brake system of the host vehicle is actuated based on the threat of collision and the actuation signal.

According to yet another aspect of the present invention, a collision detection system includes a camera and a sensor to measure data of an object relative a host vehicle, such that a threat of collision is estimated from combined data of the camera and the sensor. The independent plausibility module receives an image-based time-to-collision measured directly and independently by the camera based on a measured rate of expansion of the object. The independent plausibility module generates an actuation signal if the image-based time-to-collision is less than both a steering-based time-to-collision and a braking-based time-to-collision, which are calculated as a function of measurements received from the camera based relative to a general horizon plane. An autonomous braking controller for a brake system of the vehicle is actuated if the threat of collision is greater than a threshold and the independent plausibility module generates the actuation signal. The check against the signal from the independent plausibility module statistically increases reliability of the overall collision detection system and reduces the expense and extent of a validation process for implementing the system, without adding additional sensors to the vehicle.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
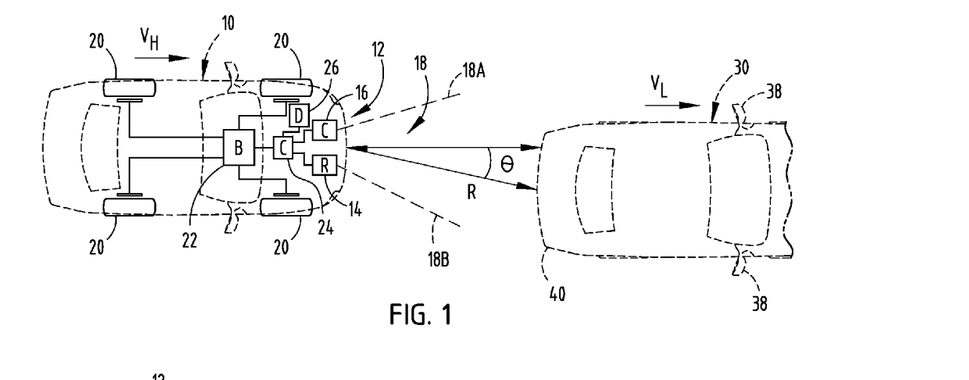
FIG. 1 is a plan view illustrating a collision detection system on a host vehicle with an object in a field of view of the host vehicle and having a substantially similar direction of travel.

For purposes of description herein, the terms "upper," "lower," "right," "left," "rear," "front," "vertical," "horizontal," and derivatives thereof shall relate to the vehicle and its collision detection system as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a host vehicle having a collision detection system 12 with an object detection sensor (R) 14 and a camera (C) 16. A field of view for the sensor 14 and the camera 16 is generally indicated with reference numeral 18 and is further defined by boundaries 18A and 18B. The host vehicle 10 shown and described herein is a passenger car (automotive vehicle) having wheels 20 for engaging a road and a brake system (B) 22 for engaging the wheels 20. Upon engaging the wheels 20, the brake system 22 is configured to reduce rotation of the wheels 20, thereby causing a longitudinal velocity $V_H$ of the host vehicle 10 relative to the road to reduce, such that the host vehicle 10 has a negative longitudinal acceleration, or a deceleration. The host vehicle 10 includes a front side, two lateral sides, and a rear side, with the sensor 14 and the camera 16 positioned generally on the front side for detecting objects in the field of view 18 forward the host vehicle 10. However, it is contemplated that the sensor 14 and camera 16 could be positioned at a different location on the host vehicle 10 for detecting objects in an alternative field of view. The sensor 14 and the camera 16 on the host vehicle 10 are generally connected to a controller (C) 24, which is connected to the brake system (B) 22. The controller 24 also receives data from an onboard vehicle dynamics detector (D) 26.

As illustrated in FIG. 1, an object 30 is located forward the host vehicle 10 in the field of view 18. The object 30, as shown, is a lead vehicle oriented in a substantially similar direction of travel as the host vehicle 10. It is further contemplated that the object 30 may alternatively include, among other things, a pedestrian, a bicycle, or other mobile or fixed structure. The host vehicle 10 and the object 30, illustrated as the lead vehicle, have respective longitudinal velocities relative to the underlying road respectively denoted as $V_H$ and $V_L$ and illustrated as vectors to show the respective general direction of travel.

Figure 2:
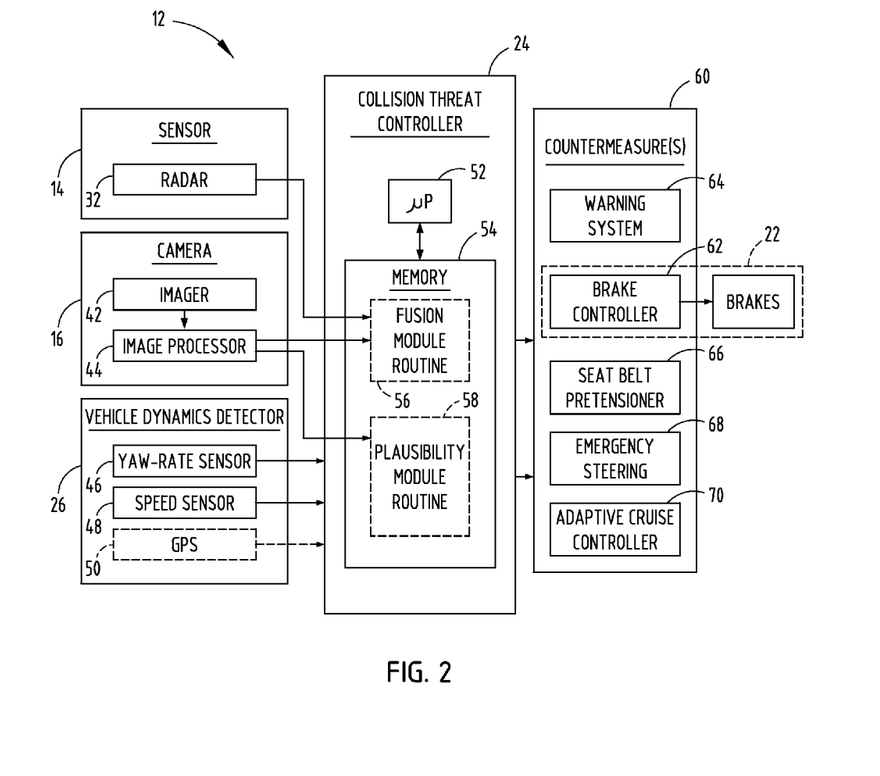
FIG. 2 is a schematic diagram of the collision detection system including a sensor, a camera, and a vehicle dynamics detector in communication with a collision threat controller, which is in communication with a countermeasure.

The object detection sensor 14 monitors the field of view 18 and when the sensor 14 detects the object 30 in the field of view 18, the sensor 14 measures a first set of target data of the object 30 relative to the host vehicle 10, based on a position of the object relative to the host vehicle. The first set of target data of the object 30 relative to the host vehicle 10 includes a first range $R_1$ (radial distance) measurement between the object 30 and the host vehicle 10, a first range rate $\dot{R}_1$ (time rate of change of radial distance) of the object 30 relative to the host vehicle 10, a first angle $\theta_1$ (azimuth) measurement of the direction to the object 30 relative to the host vehicle 10, a first angle rate $\dot{\theta}_1$ (time rate of change of azimuth) of the direction to the object 30 relative to the host vehicle 10, and a relative movement determination of the object 30 relative to the road. As shown in FIG. 2, the object detection sensor 14 comprises a radar system 32. It is contemplated that the first set of target data includes more or fewer data measurements of the object 30 or the host vehicle 10.

The camera 16 also monitors the field of view 18 for detecting one or more objects, such as the object 30. The camera 16 captures a plurality of images based on light waves from the field of view 18 at known time intervals between instances when the images of the plurality of images are captured. The camera 16 processes the plurality of images to measure a second set of target data of the object 30 relative to the host vehicle 10 and to measure an image-based time-to-collision ($TTC_{IMAGE}$) of the host vehicle 10 with the object 30 based on scalable differences of the plurality of images. More specifically, the image-based time-to-collision ($TTC_{IMAGE}$) is independently based on measuring various aspects of the object 30 in the plurality of images to determine rate of expansion of the object 30 from the perspective of the camera on the host vehicle 10.

The second set of target data of the object 30 relative to the host vehicle 10 includes a second range measurement $R_2$ between the object 30 and the host vehicle 10, a second range rate $\dot{R}_2$ of the object 30 relative to the host vehicle 10, a second angle $\theta_2$ of the direction to the object 30 relative to the host vehicle 10, a second angle rate $\dot{\theta}_2$ of the direction to the object 30 relative to the host vehicle 10, a width measurement of the object $W_{LEAD}$, an object classification 34 of the object 30, and a confidence value 36 of the object 30. The object classification 34 value is based upon common characteristics of known objects, such as height and width, to identify the object 30, for example, as a passenger vehicle, a pedestrian, a bicycle, or a stationary structure. The confidence value 36 of the object 30 is essentially a measurement of whether the individual parts of the object 30 in the field of view 18 are moving together consistently to constitute a singular object 30. For example, if side rearview mirrors 38 (FIG. 1) of the object 30 move at the substantially identical range rate as a rear bumper 40 of the object 30, the confidence value 36 of the object 30 will be high. Again, with regard to the $TTC_{IMAGE}$ measurement, the camera 16 measures the $TTC_{IMAGE}$ directly and independently based on the measured rate of expansion of the object 30 from the plurality of images. Whereas the camera 16 measures the second range and second range rate of the second set of target data based on the general position of the object 30 relative to the horizon, as is generally known in the art. Accordingly, the $TTC_{IMAGE}$ measurement is statistically independent from the measurements in the second set of target data.

Referring now to FIG. 2, the object detection sensor 14 for monitoring the field of view 18 includes the radar system 32. The radar 32 measures the first set of target data of the object 30 relative to the host vehicle 10. However, it is contemplated that the sensor 14 may also or alternatively comprise a lidar, an ultrasonic, an active infrared, a passive infrared, a telematic, an additional camera, or any other sensor known in the art.

As illustrated in FIG. 2, the camera 16 generally comprises an imager 42 for capturing the plurality of images from the field of view 18 based on light waves received from the field of view 18 at known time intervals between times when images of the plurality of images are captured. The camera 16 also comprises an image processor 44 for processing the captured plurality of images to measure the second set of target data of the object 30 relative to the host vehicle 10 and to measure the image-based time-to-collision ($TTC_{IMAGE}$) of the host vehicle 10 with the object 30, based on the rate of expansion and the position of the object 30 relative to the host vehicle 10. The camera 16 may be comprised of one or more cameras, such as a charge-coupled device (CCD) or a complementary metal-oxide-semiconductor (CMOS) image sensor device. The camera 16 generally implements instrumentation known in the art for capturing images, such that the imager 42 may comprise a visible light camera, a far infrared camera, and/or a near infrared camera. Further, the image processor 44 of the camera 16 is typically capable of buffering and processing the plurality of images in real time. It is also contemplated that the image processor 44 may be integrated in another processor or controller separate from the camera 16.

As further shown in FIG. 2, the vehicle dynamics detector 26 comprises a yaw-rate sensor 46, a speed sensor 48, and a global positioning system (GPS) 50 to measure an additional data set indicative of the kinematics of the host vehicle 10. It is contemplated that the vehicle dynamics detector 26 may include other sensors, such as a steering wheel angle sensor and an acceleration sensor, to detect other kinematic-related data of the host vehicle 10. The yaw-rate sensor 46 determines the yaw rate $\omega$ of the host vehicle 10 about a center of gravity of the host vehicle 10, measuring the rotational tendency of the host vehicle 10 about an axis perpendicular to the road surface. The speed sensor 48 measures the velocity $V_H$ of the host vehicle 10 in the direction of travel. As illustrated in dashed lines, the GPS 50 is optionally included as a component of the vehicle dynamics detector 26, such that the GPS 50 may be utilized to measure various kinematic properties and relative positioning data of the host vehicle 10.

The collision threat controller 24, as shown in FIG. 2, receives inputs from the sensor 14, the camera 16, and the vehicle dynamics detector 26. The collision threat controller 24 may include a microprocessor 52 and memory 54 according to one embodiment, and may be configured as part of a shared controller used for other purposes or configured with multiple microprocessors and memory units integrated in various locations and components as parts of or separate from the host vehicle 10. The memory 54 may include random access memory (RAM), read-only memory (ROM), and electrically erasable programmable read-only memory (EEPROM). The controller 24 receives the first data set from the sensor 14, the second data set and the $TTC_{IMAGE}$ measurement from the camera 16, and the additional data set from the vehicle dynamics detector 26. The controller 24 processes the inputs received with a fusion module routine 56 and a plausibility module routine 58 to determine whether a countermeasure 60 should be actuated to avoid or mitigate a potential collision of the host vehicle 10 with the object 30. It is contemplated that the fusion module routine 56 and the plausibility module routine 58 may be combined or incorporated with other routines to perform the general collision detection and avoidance functions and plausibility checks as described herein.

Still referring to FIG. 2, the countermeasure 60 includes an autonomous braking controller 62 for activating the brake system 22 of the host vehicle 10. As illustrated, the countermeasure 60 may also include a driver warning system 64, an occupant seat belt pretension controller 66, an emergency steering controller 68, and an adaptive cruise controller 70. It is contemplated that additional countermeasures may be incorporated to avoid a collision of the host vehicle 10 with the object 30 or to mitigate damage to the host vehicle 10, any occupants, or the object 30 upon a collision of the host vehicle 10 with the object 30. The countermeasure module 60 actuates a countermeasure device if a threat of collision received from the fusion module 56 exceeds an actuation threshold and the actuation signal from the plausibility module 58 is generated by the plausibility module 58 and received by the countermeasure module 60, thereby statistically reducing the rate of falsely actuating the countermeasure device, such as the brake system 22, and improving reliability of the collision detection system 12. Ultimately, the plausibility module 58 generates an actuation signal if the measured $TTC_{IMAGE}$ is less than a calculated steering-based time-to-collision ($TTC_{STEERING}$) and a calculated braking-based time-to-collision ($TTC_{BRAKING}$). Optionally, the plausibility module 58 may also perform additional plausibility checks to improve reliability, such as estimating whether the object 30 is in the path of the host vehicle 10 before generating the actuation signal.

Figure 3:
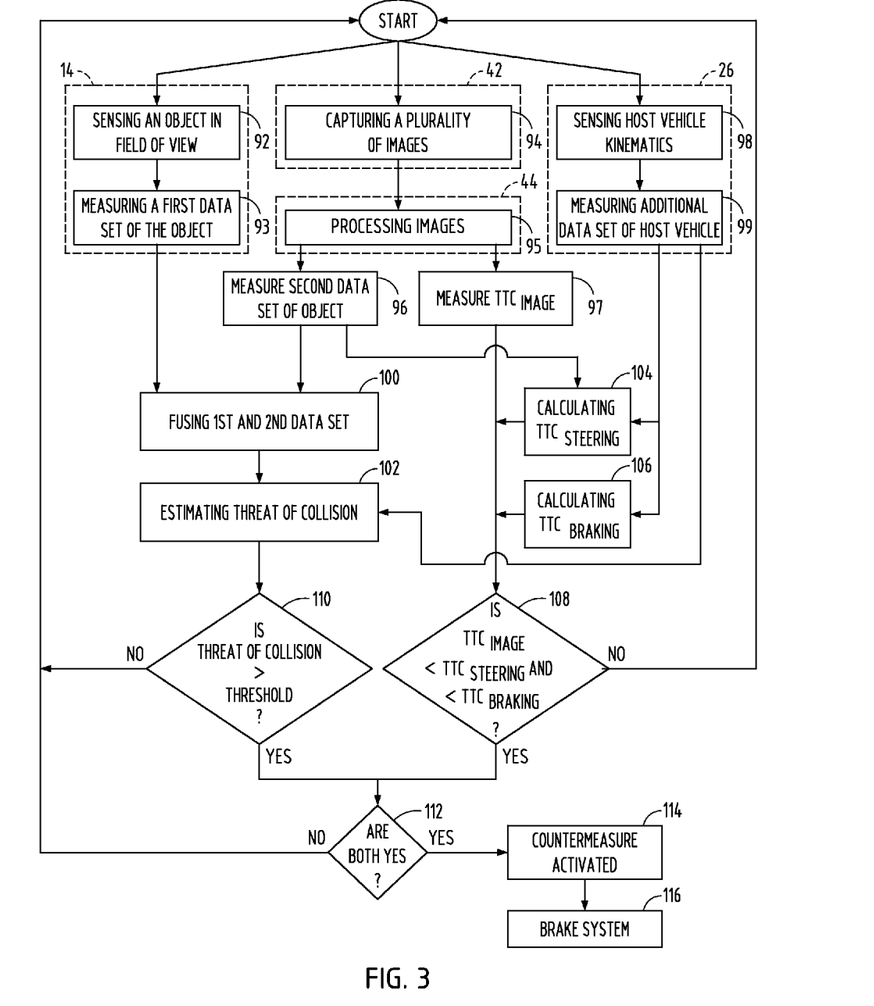
FIG. 3 is a flow chart illustrating a method for actuating a countermeasure, such as an autonomous braking controller for a brake system of a host vehicle, using a collision threat controller.

Referring now to FIG. 3, a method for actuating the autonomous braking controller 62 (FIG. 2) for the brake system 22 (FIG. 2) of the host vehicle 10 is shown. At step 92, the object 30 in the field of view 18 is sensed by the object detection sensor 14 on the host vehicle 10. The first data set of the object 30 is measured at step 93 with the object detection sensor 14, including the first range $R_1$ and first range rate $\dot{R}_1$ of the object 30 relative to the host vehicle 10, the first angle $\theta_1$ and first angle rate $\dot{\theta}_1$ of the object 30 relative to the host vehicle 10, and the relative movement determination of the object 30. The sensor 14 used to sense the object 30 and make these measurements is contemplated to be a radar system 32, as shown in FIG. 2, however, it comprises other sensors known in the art.

The method further includes the step 94 of capturing the plurality of images based on light waves from the field of view 18 by the camera 16 on the host vehicle 10 at known time intervals between instances when the images of the plurality of images are captured. The captured images are processed at step 95, illustrated utilizing the image processor 44. Thereafter, at step 96, the processed images are used to measure the second data set of the object 30, including the second range $R_2$ and second range rate $\dot{R}_2$ of the object 30 relative to the host vehicle 10, the second angle $\theta_2$ and second angle rate $\dot{\theta}_2$ of the object 30 relative to the host vehicle 10, the width $W_{LEAD}$ of the object 30, and the confidence value 36 of the object 30. The captured images are also processed at step 97 to independently measure the $TTC_{IMAGE}$ of the host vehicle 10 with the object 30 based solely on scalable differences of the object 30 derived from the plurality of images.

The vehicle dynamics detector 26 at step 98 senses the kinematics of the host vehicle 10. At step 99, the additional data set is measured with the kinematic values from the vehicle dynamics detector 26, including the yaw-rate sensor 46 for measuring the yaw rate $\omega$ of the host vehicle 10 and the speed sensor 48 for measuring the longitudinal velocity $V_H$ of the host vehicle 10. As previously mentioned, it is contemplated that the GPS 50 or other sensors could be used to measure components of this additional data set.

The method further includes step 100 of fusing of the first and second data sets to obtain the matched data set. The fusion module 56 (FIG. 2) determines the matched set of target data of the object 30 relative to the host vehicle 10 based on the first set and second set of target data received from the sensor 14 and the camera 16, respectively. Using the fused set of target data, also referred to as the matched data set, the fusion module 56 estimates a threat of collision value of the host vehicle 10 with the object 30. The threat of collision value has an increased reliability from utilizing measurements from both the first and second sets of data, as the matched set of data is derived by comparing the data sets and utilizing the more consistent value, utilizing the most accurate measurements based upon the type of sensor and camera, and/or utilizing a value between the measurements, such as the average of between the first and second sets. Accordingly, the matched set of target data is a relatively optimized value based on the first and second sets of data. At step 102, the threat of collision of the host vehicle 10 with the object 30 is then estimated based on the matched data set and the additional data set from the vehicle dynamics detector, measured at step 99.

Still referring to FIG. 3, the $TTC_{STEERING}$ of the host vehicle 10 with the object 30 is calculated at step 104 as a function of the second data set and the additional data set, including the longitudinal velocity $V_H$ of the host vehicle 10 and the yaw rate $\omega$ of the host vehicle 10. The plausibility module 58 (FIG. 2) calculates the $TTC_{STEERING}$ value to estimate the maximum time to avoid a collision of the host vehicle 10 with the object 30 by steering the host vehicle 10. Although this value can be derived or estimated with various functions, $TTC_{STEERING}$ herein is calculated based on the second set of target data received from the camera 16 and an additional set of data received from a vehicle dynamics detector 26.

The $TTC_{BRAKING}$ of the host vehicle 10 with the object 30 is calculated at step 106 as a function of the additional data set, namely the longitudinal velocity $V_H$ of the host vehicle 10. The plausibility module 58 (FIG. 2) calculates the $TTC_{BRAKING}$ value to estimate the maximum time to avoid a collision of the host vehicle 10 with the object 30 by braking with the brake system 22 (FIG. 1) of the host vehicle 10. This value can be derived or estimated in various ways, such as utilizing additional measurements of vehicle weight, road conditions, and braking capabilities. However, $TTC_{BRAKING}$, as illustrated and described herein, is calculated based on the additional set of data received from a vehicle dynamics detector 26 and other values selected as constants, described in more detail below.

The method includes a determination step 108 of generating an actuation signal if the measured $TTC_{IMAGE}$ is less than the calculated $TTC_{STEERING}$ and the $TTC_{BRAKING}$. Step 108 is contemplated as a function of the plausibility module 58 (FIG. 2), allowing a countermeasure to be actuated only if the signal is present. Another determination step 110 includes comparing the threat of collision with a threshold value. This step is contemplated as a function of the fusion module routine 56 (FIG. 2), however, it may be performed by the brake controller 62 or another controller in the host vehicle 10. As shown at step 112, the countermeasure is only activated if the threat of collision exceeds the threshold and the actuation signal is generated, and otherwise the determination directs the system to the start of the method. If both the threat of collision exceeds the threshold and the actuation signal is generated, ultimately the autonomous braking controller is activated at step 114. Accordingly, upon activating the countermeasure, such as the brake controller 62, the countermeasure functions to prevent or mitigate a collision of the host vehicle 10 with the object 30. For instance, as illustrated, the brake controller 62 may actuate the brake system 22 of the host vehicle 10 at step 116. It is contemplated that the brake controller 62 is integrated with the brake system 22, as shown in FIG. 2.

Figure 4:
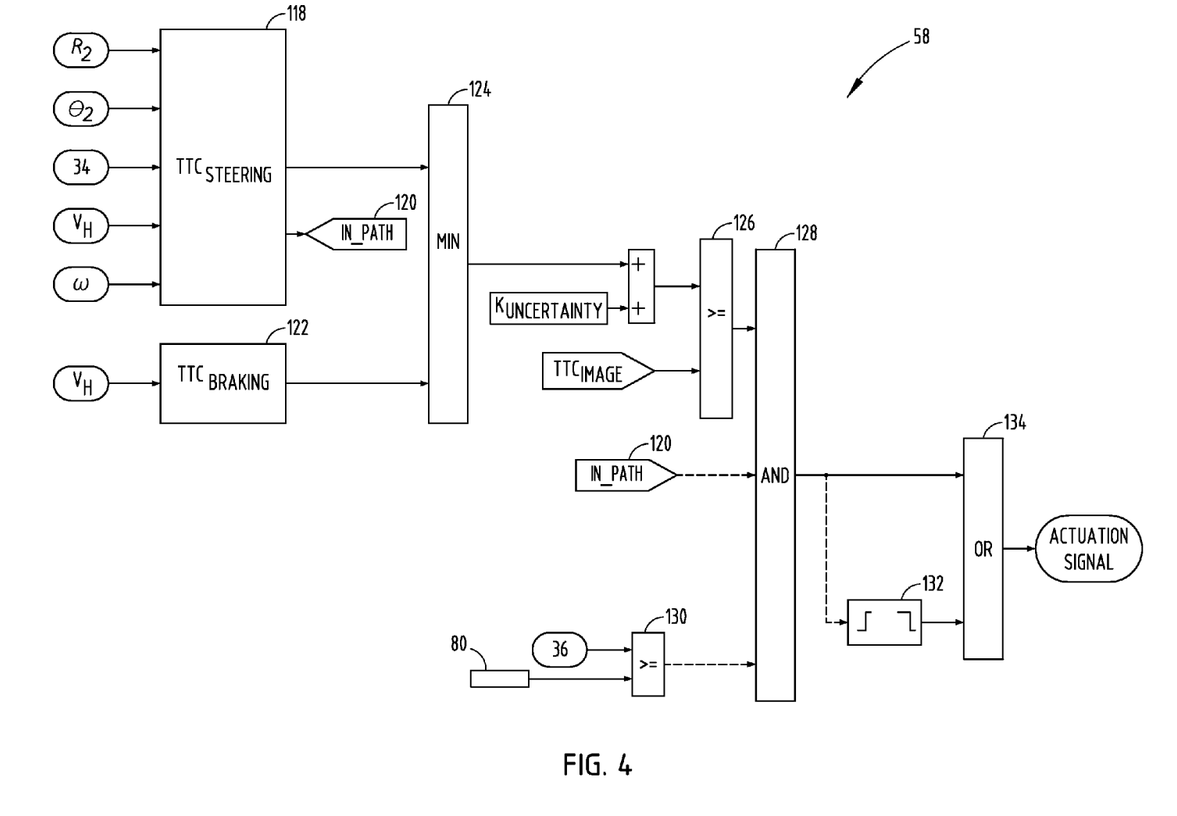
FIG. 4 is a logic diagram illustrating a routine for generating an actuation signal for a countermeasure module.

Referring now to FIG. 4, a logic flow diagram of the plausibility module 58 is illustrated, where it can be seen that the $TTC_{STEERING}$ is calculated at step 118 as a function of the second range $R_2$ from the camera 16, the second angle $\theta_2$ from the camera 16, the measured object classification 34 from the camera 16, the velocity $V_H$ from the speed sensor 48 of the vehicle dynamics detector 26, and the yaw rate $\omega$ from the yaw-rate sensor 46 of the vehicle dynamics detector 26. In addition to calculating an output of the $TTC_{STEERING}$, the $TTC_{STEERING}$ function also optionally determines whether the object 30 is in the path of the host vehicle 10, shown as an IN_PATH value 120.

More specifically, $TTC_{STEERING}$ can be expressed as the following algorithm:

$$TTC_{STEERING} = \sqrt{\frac{2\left((1/2W_{LEAD} + 1/2W_{HOST}) - \left|\frac{R^2\omega}{2V} - R\theta\right|\right)}{K_{LAT\_MAX}A_{LAT\_DRIVER\_MAX}}}$$

In the above expression, $TTC_{STEERING}$ represents the maximum calculated time to avoid collision by steering the host vehicle 10. The $TTC_{STEERING}$ logic is a simplified equation assuming no relative lateral velocity of the host vehicle 10 or the object 30. A more complex strategy could be defined using measured lateral velocity, among other things. $W_{LEAD}$ represents the width of the object 30, or lead vehicle, such as the width of a car, motorcycle, or pedestrian. $W_{LEAD}$ may either be a constant or measured by the camera 16 or other sensor. $W_{HOST}$, in turn, represents the width of the host vehicle 10. R equates to $R_2$ and represents the range from the host vehicle 10 to the object 30, as measured by the camera 16. The ω variable represents the measured yaw-rate of the host vehicle 10, which can be measured by the yaw-rate sensor 46, the GPS 50, the camera 16, or an inertial sensor. V equates to $V_H$ and represents the measured longitudinal velocity of the host vehicle 10, which can be measured by the speed sensor 48, the GPS 50, wheel speed sensors, the camera 16, or an inertial sensor. θ equates to $θ_2$ and represents the relative angle from the host vehicle 10 to the object 30, as measured by the camera 16. $A_{LAT\_DRIVER\_MAX}$ represents the maximum achievable lateral acceleration of the host vehicle 10 by steering. $A_{LAT\_DRIVER\_MAX}$ can be estimated as a constant or derived as a function of other information, such as road friction, speed, vehicle mass, brake system capabilities, driver preferences, or driver capabilities. $K_{LAT\_MAX}$ simply represents a scaling factor which is typically less than one (1.0) and can be calibrated to receive desirable calculations.

Figure 5:
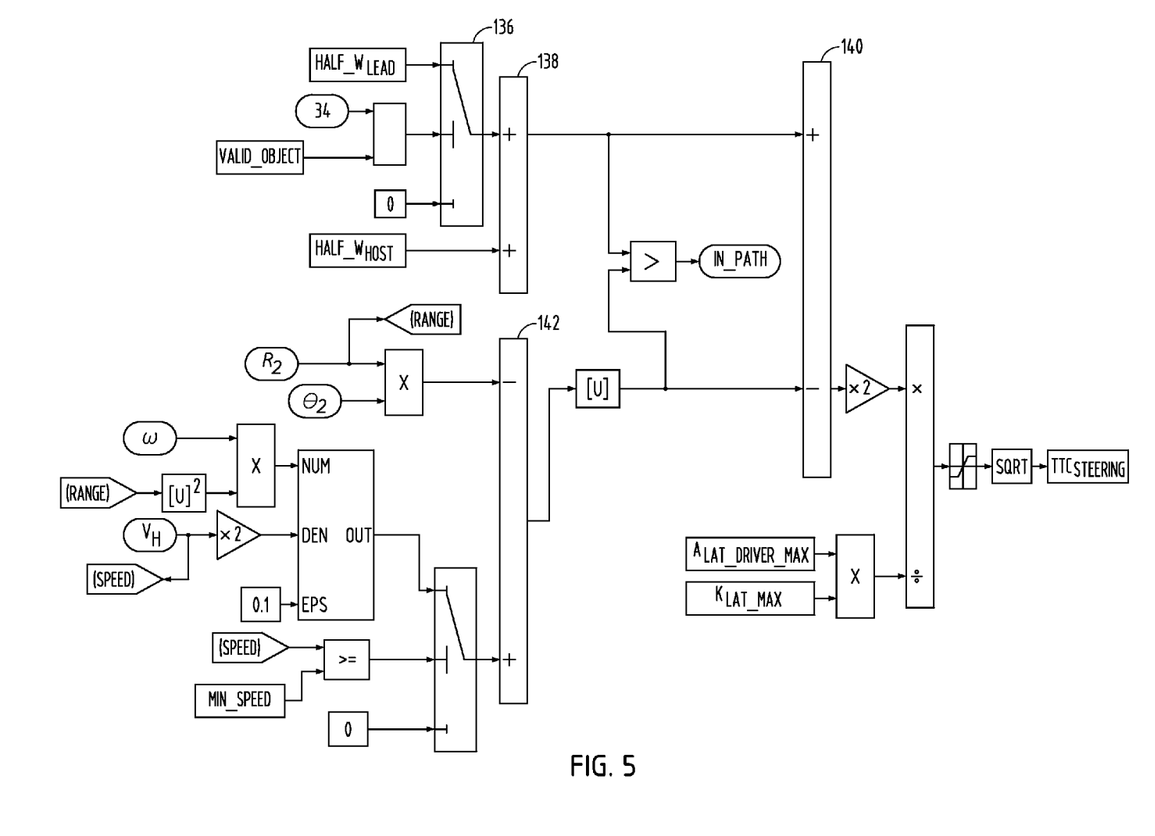
FIG. 5 is a logic diagram illustrating a routine for estimating and calculating a steering based time-to-collision.

As illustrated in FIG. 5, the function used to calculate the $TTC_{STEERING}$ is shown as a logic flow diagram, detailing the steps of the function. The diagram uses the same variables as outlined above to expresses the calculation steps. As illustrated, the measured object classification 34 from the camera 16 is compared with the VALID_OBJECT field to ensure that the classification is valid and to determine the corresponding $W_{LEAD}$ value. It is also contemplated that the $W_{LEAD}$ value may be measured. At switch 136, if the object classification is determined to be valid, half of the width of the object $W_{LEAD}$ is output, represented as HALF_$W_{LEAD}$. This output is summed at step 138 with half of the width of the host vehicle $W_{HOST}$, such that a driver of the host vehicle 10 would, at a maximum, need to move the host vehicle 10 laterally a distance equal to the combined halves of the $W_{LEAD}$ and the $W_{HOST}$ to avoid a collision, assuming the host vehicle 10 can freely move to either side of the object 30. This output is then reduced at step 140 by the absolute value of the output of the step referenced as 142, which, in addition other steps leading to 142, provides a comparison of $V_H$, or (SPEED), with MIN_SPEED, a threshold speed for the host vehicle to exceed before the $TTC_{STEERING}$ output value is reasonably accurate. In general, the remainder of the steps in FIG. 5 provides the mathematical steps to calculate $TTC_{STEERING}$, as recited in the algorithm above.

Figure 6:
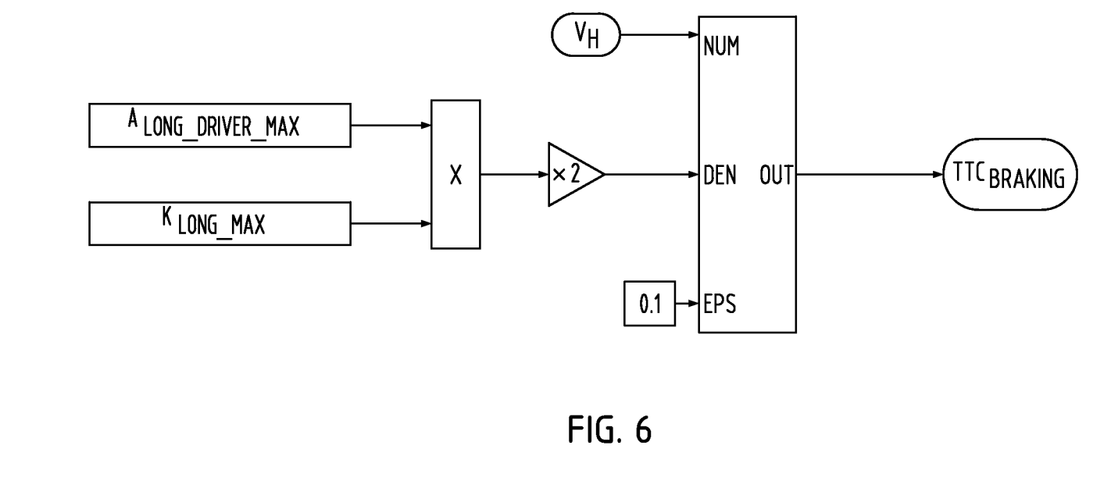
FIG. 6 is a logic diagram illustrating a routine for estimating and calculating a braking-based time-to-collision.

Again referencing FIG. 4, $TTC_{BRAKING}$ is shown as being calculated at step 122 as a function of speed or longitudinal velocity, which is generally equal to the velocity $V_H$ measurement from the speed sensor 48 of the vehicle dynamics detector 26. FIG. 6 illustrates a logic flow diagram detailing the steps of the function used to calculate $TTC_{BRAKING}$. Essentially, the velocity $V_H$ is divided by two times an estimated maximum longitudinal acceleration value, $A_{LONG\_DRIVER\_MAX}$, to calculate the $TTC_{BRAKING}$. The maximum longitudinal acceleration, $A_{LONG\_DRIVER\_MAX}$, or deceleration, shown as a constant value, is selected for the host vehicle 10 based upon the type, weight, and brake configuration of the host vehicle 10. It is conceived that the maximum longitudinal acceleration, $A_{LONG\_DRIVER\_MAX}$ could be a value derived from measuring road friction, vehicle mass, brake system conditions and capabilities, driver preferences, and/or driver capabilities, among other things.

More specifically, $TTC_{BRAKING}$ can be expressed as the following algorithm:

$$TTC_{BRAKING} = \frac{V}{2K_{LONG\_MAX}A_{LONG\_DRIVER\_MAX}}$$

In the above expression, $TTC_{BRAKING}$ represents the maximum calculated time to avoid collision impact by braking the host vehicle 10. Again, a more complex strategy could be defined using measured lateral velocity, among other things. V equates to $V_H$ and represents the measured longitudinal velocity of host vehicle 10. $A_{LONG\_DRIVER\_MAX}$ represents the maximum achievable longitudinal acceleration of the host vehicle 10 by braking, which is selected as a constant here, although it is conceivable that it could be derived as a function of other sensor or selected information, such as road friction, speed, vehicle mass, brake system capabilities, driver preferences, and/or driver capabilities. For purposes of simplicity, $A_{LONG\_DRIVER\_MAX}$ herein is selected constant rate of deceleration of the host vehicle. $K_{LONG\_MAX}$ simply represents a scaling factor which is typically less than one (1.0) and can be calibrated to receive desirable calculations.

Referring again in FIG. 4, the $TTC_{STEERING}$ and the $TTC_{BRAKING}$ values generated at step 118 and 122, respectively, are compared at step 124, which is denoted as MIN, to output the lesser of the two values. The output from step 124 is summed with a constant, $K_{UNCERTAINTY}$, to provide a value to be compared with the measured $TTC_{IMAGE}$ at step 126. If the value greater than or equal to the measured $TTC_{IMAGE}$ at step 126, the plausibility module begins to generate the actuation signal. Aside from $K_{UNCERTAINTY}$, a constant value used to calibrate the plausibility module 58, the plausibility module 58 begins to generate the actuation signal if the measured $TTC_{IMAGE}$ is determined to be less than the calculated $TTC_{STEERING}$ and the $TTC_{BRAKING}$. As shown in FIG. 4, additional plausibility checks may be performed at step 128 before the plausibility module generates the actuation signal. One plausibility check is ensuring that the I_PATH value 120 estimated by the $TTC_{STEERING}$ function indicates that the object 30 is in the path of travel of the host vehicle 10.

Specifically, the IN_PATH value function or pseudocode logic determination can be expressed as follows:

$$\text{IF } (1/2W_{LEAD} + 1/2W_{HOST}) > \left|\frac{R^2\omega}{2V} - R\theta\right| \begin{array}{l} \text{THEN IN\_PATH = TRUE} \\ \text{ELSE IN\_PATH = FALSE} \end{array}$$

In the above expression, the input variables represent the same values as measured or calculated in the $TTC_{STEERING}$ expression. Accordingly, it is conceivable that a more complex strategy could be defined using measured lateral velocity, among other things.

Still referring to FIG. 4, the plausibility module 58 may also perform a plausibility check at step 130 that the confidence value 36 of the object 30 measured by the camera 16 exceeds a confidence threshold 80. The confidence value 36 essentially is a measurement of whether the individual parts of the object 30 are moving together consistently, for example, the side rearview mirrors 38 of the object 30 more at a substantially identical range rate as the rear bumper 40 of the object 30. Step 128 only allows the actuation signal to be generated if all the plausibility checks are passed and the $TTC_{IMAGE}$ is determined to be less than the calculated $TTC_{STEERING}$ and the $TTC_{BRAKING}$. Therefore, the countermeasure 60 (FIG. 2) may actuate based additionally on whether the object 30 is in the path of travel of the vehicle 10 and whether the confidence value 36 of the object exceeds the confidence threshold 80.

If all the plausibility checks have been passed, the plausibility module 58 may optionally include a time delay at step 132 to continue to generate the actuation signal for a set constant period of time, $K_{OFF\_TIM\_DELAY}$, such as 0.5 seconds, after the actuation signal has generated for another set constant period of time, $K_{ON\_TIME\_DELAY}$, such as 0.5 seconds, to ensure that the countermeasure does not lose the actuation signal due to conditions created by the countermeasure or a momentary failure of one of the plausibility checks. The delay at step 132 can be expressed in pseudocode logic as follows:

```
IF
    actuation signal from step 128 is TRUE continuously
    for the past K_ON_TIME_DELAY seconds
THEN
    actuation signal shall remain TRUE for K_OFF_TIME_DELAY seconds
    following the above conditions transitioning to FALSE.
```

As shown at step 134, the time delay at step 132 may alternatively be used to generate the actuation signal when it is not received directly from step 128. It is also contemplated that other time delays may be included at several other locations in the plausibility module, such as in concert with the plausibility checks 120 and 130.

In a simplified expression of the plausibility module 58, utilizing the optional IN_PATH value check, the actuation signal is enabled, or generated, when a CMbB_PLAUSIBLE variable is true. This function or pseudocode logic determination, as also partially illustrated in FIG. 4, can be expressed as follows:

```
IF
    ((min(TTC_STEERING, TTC_BRAKING) + K_UNCERTAINTY) >
    TTC_MEASURED) AND (IN_PATH = TRUE)
THEN
    CMbB_PLAUSIBLE = TRUE → Countermeasure Actuation Signal
    is Enabled
ELSE
    CMbB_PLAUSIBLE = FALSE → Countermeasure Actuation Signal
    is Disabled
```

In the above expression, or logical determination, $TTC_{MEASURED}$ equates to $TTC_{IMAGE}$ and represents the time to collision between the host vehicle 10 and the object 30, as measured by the camera 16. In addition, $K_{UNCERTAINTY}$ again simply represents a constant that can be calibrated to receive desirable outcomes.

Referring again to FIGS. 2 and 3, the countermeasure module 60 actuates a countermeasure device if the threat of collision received from the fusion module 56 exceeds an actuation threshold and the actuation signal from the plausibility module 58 is generated by the plausibility module 58 and received by the countermeasure module 60. Upon this occurrence, the autonomous braking controller 62 for the brake system 22 of the host vehicle 10 is actuated. The actuation signal generated by the plausibility module 58 statistically reduces the rate of falsely actuating the countermeasure device, specifically the autonomous braking controller 62, and improves reliability of the overall collision detection system 12. Accordingly, the improved reliability reduces the expense and extent of validation needed for implementing an autonomous braking system.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A collision detection system for a host vehicle, comprising:
   a sensor for detecting an object in a field of view and measuring a first set of target data based on a position of the object relative to the host vehicle;
   a camera for capturing a plurality of images from the field of view and processing the plurality of images to measure a second set of target data, including object classification and confidence values and an azimuth angle and angle rate of the object relative to the host vehicle, and to measure an image-based time-to-collision ($TTC_{IMAGE}$) of the host vehicle with the object based on scalable differences of the plurality of images;

a fusion module for determining a matched set of target data based on optimized values of the first and second sets of target data received from the sensor and the camera, wherein the fusion module estimates a threat of collision of the host vehicle with the object based on the matched set of target data;

a plausibility module for calculating a steering-based time-to-collision ($TTC_{STEERING}$) and a braking-based time-to-collision ($TTC_{BRAKING}$) of the host vehicle with the object based on the second set of target data received from the camera and an additional set of data received from a vehicle dynamics detector on the host vehicle, wherein the plausibility module generates an actuation signal if the $TTC_{IMAGE}$ is less than the $TTC_{STEERING}$ and the $TTC_{BRAKING}$; and a countermeasure module for actuating a countermeasure device if the threat of collision received from the fusion module exceeds an actuation threshold and the actuation signal from the plausibility module is generated and received, thereby statistically increasing reliability of the collision detection system.

2. The collision detection system of claim 1, wherein the first set of target data measured by the sensor includes a first range and a first range rate of the object relative to the host vehicle, a first angle and a first angle rate of the object relative to the host vehicle, and a relative movement determination of the object, and wherein the sensor comprises a radar system.

3. The collision detection system of claim 1, wherein the camera includes an imager for capturing the plurality of images from the field of view based on light waves received from the field of view at known time intervals between times when images of the plurality of images are captured.

4. The collision detection system of claim 1, wherein the second set of target data measured by the camera includes a second range and second range rate of the object relative to the host vehicle, a second azimuth angle and second azimuth angle rate of the object relative to the host vehicle, a width measurement of the object, and an object classification of the object.

5. The collision detection system of claim 4, wherein the vehicle dynamics detector includes a yaw-rate sensor and a speed sensor on the host vehicle, and wherein the additional set of data received from the vehicle dynamics detector includes a yaw rate of the host vehicle measured by the yaw-rate sensor and a velocity of the host vehicle measured by the speed sensor.

6. The collision detection system of claim 5, wherein the $TTC_{STEERING}$ is calculated as a function of the second range and the second range rate, the second azimuth angle and the second azimuth angle rate, the object classification, the yaw rate, and the velocity, and wherein the plausibility module estimates whether the object is in a path of travel of the host vehicle.

7. The collision detection system of claim 5, wherein the $TTC_{BRAKING}$ is calculated as a function of the velocity measured by the speed sensor and a selected constant rate of deceleration of the host vehicle.

8. The collision detection system of claim 1, wherein the countermeasure device comprises an autonomous braking controller for activating a brake system of the host vehicle.

9. A collision detection system for a vehicle, comprising:
a sensor;
a camera;
a fusion module for determining a matched set of target data based on values of a first and second set of data received from the sensor and the camera, wherein the fusion module estimates a threat of collision of the vehicle with an object based on the matched set of target data;
a plausibility module generating a signal if a time-to-collision measured by the camera is less than a steering-based time-to-collision and a braking-based time-to-collision, wherein the steering-based time-to-collision is calculated as a function of a range of the object relative to the vehicle, an azimuth angle of the object relative to the vehicle, a velocity of the vehicle, a lateral acceleration of the vehicle, a yaw-rate of the vehicle, and a width measurement of the object and the vehicle; and
a countermeasure actuating with the signal present and the collision threat exceeding a threshold.

10. The collision detection system of claim 9, wherein the time-to-collision measured by the camera is based on scalable differences of images captured by the camera.

11. The collision detection system of claim 9, wherein the camera includes an imager for capturing a plurality of images from light waves received from a field of view at known time intervals between time when images of the plurality of images are captured, and wherein the camera includes an image processor for processing the plurality of images for measuring the data and the time-to-collision.

12. The collision detection system of claim 9, wherein the matched data used by the fusion module comprises:
a first data set measured by the sensor having a first range and a first range rate of the object relative to the vehicle, a first azimuth angle and a first azimuth angle rate of the object relative to the vehicle, and a relative movement determination of the object; and
a second data set measured by the camera having a second range and a second range rate of the object relative to the host vehicle, a second azimuth angle and a second azimuth angle rate of the object relative to the host vehicle, a width measurement of the object, a classification of the object, and a confidence value of the object, and wherein the fusion module determines the matched data based on optimized values with increased reliability from the first and second sets of target data received from the sensor and the camera.

13. The collision detection system of claim 12, wherein the braking-based time-to-collision is calculated as a function of a measured velocity of the vehicle and an estimated rate of deceleration of the vehicle.

14. The collision detection system of claim 12, wherein the plausibility module estimates whether the object is in a path of travel of the vehicle, and wherein the countermeasure actuates based additionally on whether the object is in the path of travel of the vehicle and whether the confidence value of the object exceeds a confidence threshold.

15. The collision detection system of claim 9, further comprising:
a vehicle dynamics detector having a yaw-rate sensor and a speed sensor, wherein an additional set of data measured by the vehicle dynamics detector includes a yaw rate from the yaw-rate sensor and a velocity of the vehicle from the speed sensor.

16. The collision detection system of claim 9, wherein the countermeasure comprises an autonomous braking controller for activating a brake system of the vehicle, and wherein the sensor comprises a radar system.

17. The collision detection system of claim 9, wherein the camera measures object classification and confidence values and an azimuth angle and angle rate for calculating the steering-based time-to-collision.

18. A method for actuating an autonomous braking controller for a brake system of a host vehicle, the method comprising the steps of:

sensing an object in a field of view by an object detection sensor on the host vehicle;

measuring a first data set of the object with the object detection sensor, including a first range and a first range rate of the object relative to the host vehicle, a first angle and a first angle rate of the object relative to the host vehicle, and a relative movement determination of the object;

capturing a plurality of images based on light waves from the field of view by a camera on the host vehicle at known time intervals between instances when the images of the plurality of images are captured;

processing the plurality of images to measure a second data set of the object, including a second range and a second range rate of the object relative to the host vehicle, a second azimuth angle and a second azimuth angle rate of the object relative to the host vehicle, a width of the object, and an image based time-to-collision ($TTC_{IMAGE}$) of the host vehicle with the object based on scalable differences of the object derived from the plurality of images;

measuring an additional data set with a vehicle dynamics detector, including a yaw-rate sensor for measuring a yaw rate of the host vehicle and a speed sensor for measuring a longitudinal velocity of the host vehicle;

processing the first and second data sets, the $TTC_{IMAGE}$, and the additional data set;

estimating a threat of collision of the host vehicle with the object based on a combination of the first and second data sets;

determining a steering-based time-to-collision ($TTC_{STEERING}$) of the host vehicle with the object as a function of the second data set, the longitudinal velocity of the host vehicle, and the yaw rate of the host vehicle;

determining a braking-based time-to-collision ($TTC_{BRAKING}$) of the host vehicle with the object as a function of the longitudinal velocity of the host vehicle and a selected constant rate of deceleration of the host vehicle;

generating an actuation signal if the $TTC_{IMAGE}$ is less than the $TTC_{STEERING}$ and the $TTC_{BRAKING}$; and actuating the autonomous braking controller for the brake system of the host vehicle based on the threat of collision exceeding a threshold and the actuation signal being present.

19. The method for actuating an autonomous braking controller of claim 18, wherein the plurality of images are processed to measure object classification and confidence values for determining the threat of collision of the host vehicle with the object.

\* \* \* \* \*